United States Patent
Kayashima

[11] 4,125,829
[45] Nov. 14, 1978

[54] MULTIPLE FORMAT PRINT PATTERN GENERATING APPARATUS

[75] Inventor: Kozo Kayashima, Isehara, Japan
[73] Assignee: Hitachi, Ltd., Japan
[21] Appl. No.: 758,793
[22] Filed: Jan. 12, 1977
[30] Foreign Application Priority Data
Jan. 21, 1976 [JP] Japan .................................. 51-4911
[51] Int. Cl.$^2$ .............................................. G06F 3/14
[52] U.S. Cl. ................................ 340/324 AD; 178/30
[58] Field of Search ................... 340/324 A, 324 AD; 178/30, 15

[56] References Cited
U.S. PATENT DOCUMENTS
3,889,253  6/1975  Ross ............................ 340/324 AD

*Primary Examiner*—Marshall M. Curtis
*Attorney, Agent, or Firm*—Craig & Antonelli

[57] ABSTRACT

There is provided a print pattern generating apparatus used for a printer for printing character information along with a format such as of an account book leaf or the like. The format is decomposed into a plurality of lines of dots, each line being represented by a dot pattern for memorizing such that a set of different dot patterns included in one of the formats are stored in a first memory, while the format pattern is stored in a second memory in the form of a combination of the addresses where the dot patterns of the respective lines constituting the format are stored. The dot patterns stored in the second memory are selectively read out in accordance with the addresses successively read out from the first memory and transferred for printing them in superposed relationship with the pattern of the character information.

4 Claims, 8 Drawing Figures

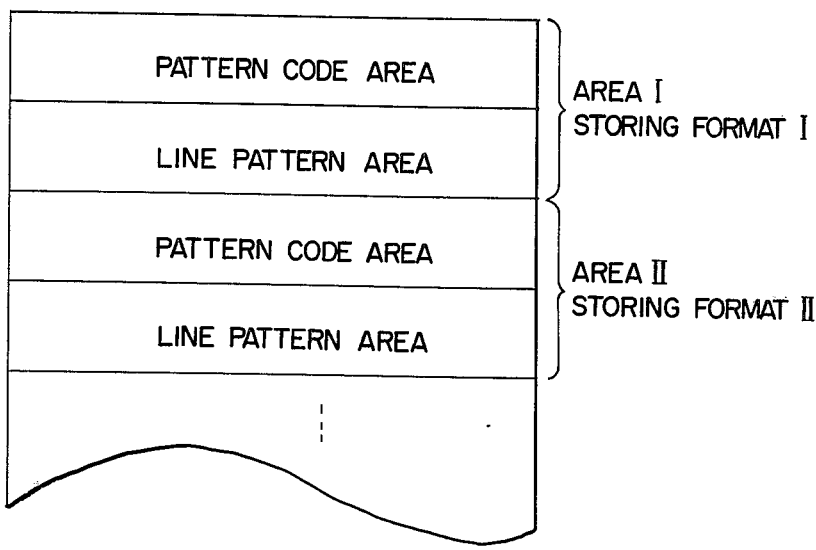

MULTIPLE FORMAT PRINT PATTERN GENERATING APPARATUS

BACKGROUND OF THE INVENTION

1. Field of the Invention

This invention relates to a print pattern generating apparatus including a novel format pattern generating unit for use with a printer in which the character and/or numeral information is printed on a sheet together with a desired format pattern and more particularly, to a print pattern generating apparatus including a generating unit which prepares a plurality of format patterns, including, for example, complicated ruled lines and characters, and provides a pattern signal of any desired one of the format patterns for the printing purpose.

2. Description of the Prior Art

When recording output information from an electronic computer or the like on a format such as an account book leaf, it has been usual to prepare a recording paper on which a predetermined format pattern is printed and to record the output information on the paper. According to the prior art method, however, prior to the recording operation, it is required to select a recording paper from several recording papers printed with different format patterns and set the selected recording paper in a recording unit or printer. This operation requires additional work and the need of an additional operator for such work.

To resolve this problem, it has been tried to use a plain paper sheet without any format pattern, as a recording paper, and print thereon a selected one of the format patterns, which are prepared preliminarily in the printer, together with desired information derived from an electronic computer.

In one apparatus for this purpose, a format pattern recorded on a film is projected upon a photosensitive drum of a printer of the electrographic type and character information to be printed is superimposed thereon. Generally, the printer of the electrographic type is arranged such that an electrostatic latent image is formed on the charged photosensitive drum by scanning thereon with a beam of light such as for example a laser beam, toners are deposited on the latent image electrostatically, and then transferred to the recording paper to be fixed thereon. By using such a printer and film recorded with a format pattern disposed adjacent to the photosensitive drum, the format pattern is projected upon the photosensitive drum to form a latent image of the format pattern, and then the character latent image is formed by the light scanning method in superimposed relationship with the format latent image.

This conventional method is advantageous in that the preliminarily prepared format patterns are visible, but disadvantageous in that a sophisticated mechanism is required for automatic selection of a desired one of the prepared format patterns and irregular rotation of the photosensitive drum may cause relative displacement between the format pattern latent image and the character latent image which is formed according to information delivered from the electronic computer.

In an alternative conventional method, a format pattern is divided into regions in the form of square frames each having a size corresponding to the size of one printed character, patterns of the individual square frames are represented by suitable codes. In this way any format is represented by and stored in the form of a combination of the codes. A pattern generator is provided for generating any of the patterns corresponding to the individual codes, and an output of the pattern generator and an output of a character generator for generating output information regarding a character or the like are derived together in parallel and for recording them on a suitable medium.

This conventional method is advantageous in that it does not need such a sophisticated mechanism for selecting a desired format from a number of formats and displacement of print as encountered with the preceding conventional method, but disadvantageous in that the format is required to be decomposed into a number of standard components and it cannot be applied to printing of formats such as carrying characters or the like other than the standard components.

In many applications, it is desired to use a format including, in addition to ruled lines, a title and/or remarks whose characters are greatly different in size from ordinary characters, and figures of company insignia and seal impression. The conventional method is not adaptive to printing such a format.

SUMMARY OF THE INVENTION

Accordingly, an object of this invention is to provide a novel print pattern generating apparatus used for a printer capable of printing a format and print information simultaneously.

Another object of this invention is to provide a print pattern generating apparatus capable of printing a sophisticated format.

According to this invention, there is provided a print pattern generating apparatus in which each of given formats such as of an account book leaf or the like is represented by a dot pattern, the dot pattern is decomposed into parallel dot lines, of which only those having different patterns are memorized in a first memory and each of the formats is stored in a second memory in the form of a combination of the addresses of the first memory where the patterns of the dot lines are memorized, and when printing, any desired format is read out from the first memory in accordance with the addresses relating to the desired format and read out from the second memory to be superimposed on character information delivered from a central processor unit.

BRIEF DESCRIPTION OF THE DRAWINGS

FIG. 6 is a diagram useful to explain the content of a large capacity memory.

FIG. 7 is a diagram useful to explain the content of a pattern code register.

FIG. 8 is a diagram useful to explain the content of a pattern memory.

DESCRIPTION OF THE PREFERRED EMBODIMENT

Figure 1:
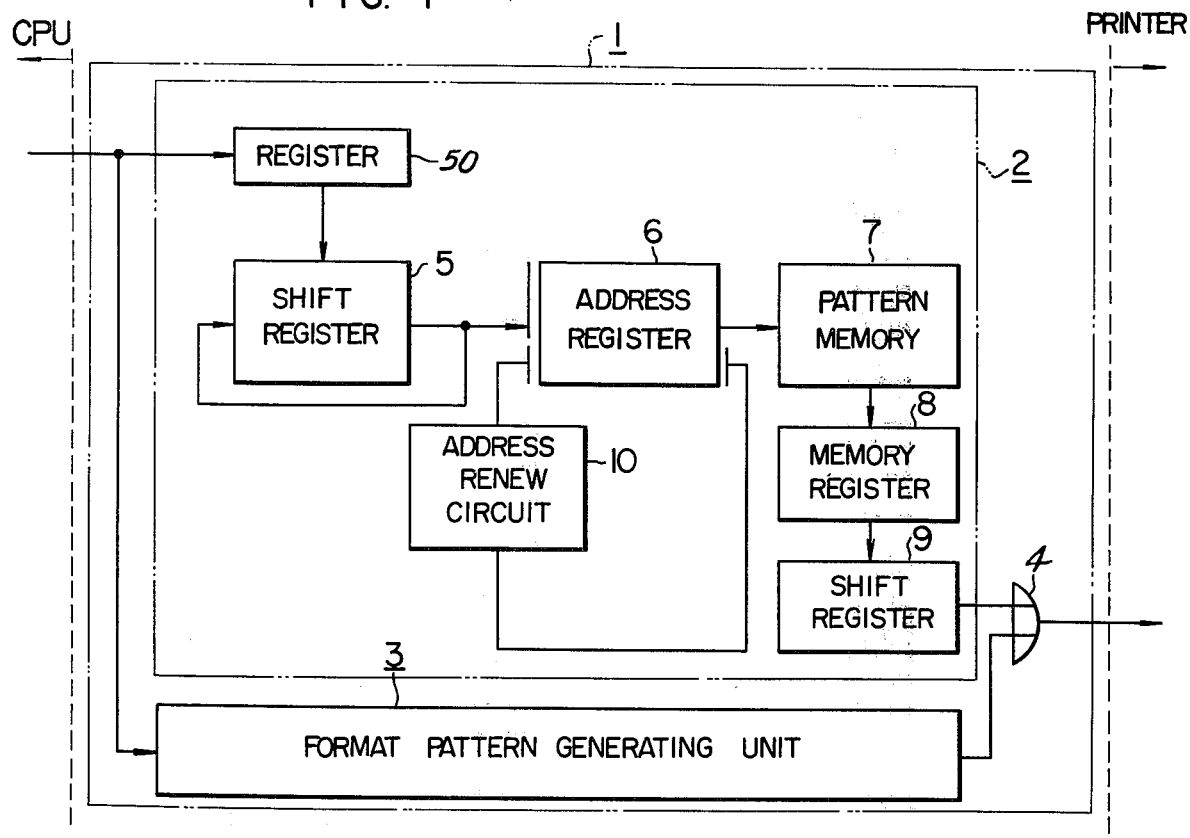
FIG. 1 is a schematic block diagram of a print pattern generating apparatus according to this invention.

As diagramatically shown in FIG. 1, a print pattern generating apparatus generally designated at 1 comprises a character pattern generator unit 2, a format pattern generator unit 3 and an OR-gate 4. The print pattern generating apparatus 1 converts coded character information transferred thereto from a related central processor unit CPU into character pattern information and transmits the converted character pattern information to a printer together with information of a desired format to print them in superposed relationship on a suitable recording medium. The printer may be a laser beam printer as disclosed in U.S. Pat. No. 3,701,999 granted on U.S. patent application Ser. No. 190,024 filed Oct. 18, 1971 in which the latent electrostatic image is formed on the printer drum by scanning, in a television scanning fashion, the surface of the drum with a laser beam modulated according to a print pattern. Character information included in one page of an account book leaf is edited according to predetermined rows into which the one page is divided in the central processor unit and transferred to the print patterns generating apparatus 1 row by row. In advance of transfer of character information, a format directing signal for designating the format of the one page is transferred from the central processor unit to the format pattern generator unit 3. Information of various types of format patterns are preliminarily stored in the format pattern generator unit 3. A format pattern designated by the format directing signal is successively read out from the format pattern generator unit 3 in predetermined relationship in time with the occurrence of the character information to be transferred to the OR-gate 4. The format is decomposed into small segments or dots and each of the dots is represented by logic "1" or "0" such that the dots represented by logic "1" correspond substantially to the part of the format where the pattern exists, and the dots represented by logic "0" correspond to the remaining part. Dot information represented by logics "1" and "0" is memorized in the format pattern generator unit 3 in the form of a series of the logics which can be read out in synchronism with the scanning of the laser beam.

The character pattern generator unit 2 may be the same as a character pattern generator for use in conventional printer apparatus or cathode ray tube display apparatus, for example as disclosed in U.S. Pat. No. 3,622,701 and will be described in brief.

The character pattern generator unit 2 comprises a pattern memory 7 in which a predetermined area including each character or symbol pattern is decomposed into small dots and memorized such that the dots on which the character is written are each represented by a logic "1" and the remaining blank dots are each by a logic "0". One character area is decomposed into, for example, a 16 × 16 or 32 × 32 dot matrix.

Figure 2:
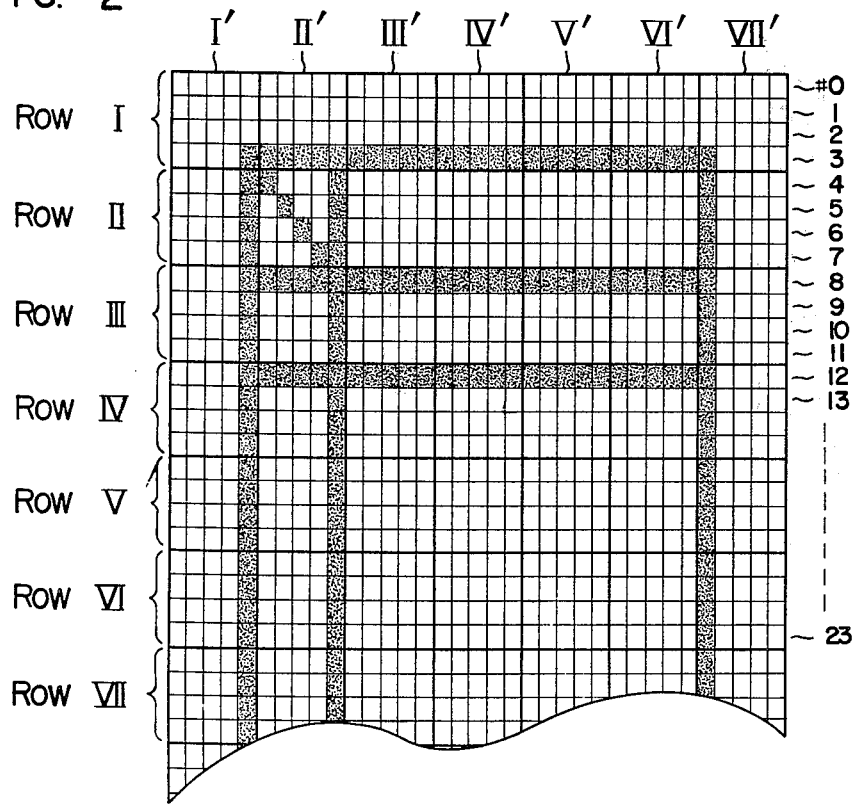
FIG. 2 is a diagrammatic representation of one example of a format of an account book leaf.

The pattern memory 7 has memory blocks to memorize the individual character patterns. In the central processor unit (not shown), character information representing characters to be printed is stored in the form of addresses of the memory blocks of the pattern memory 7 where the characters are memorized, respectively. The character information is read out from the central processor unit piece thereof, each piece of the character information corresponding to the characters to be printed in one of a plurality of rows of character areas, into which the format paper is divided, as shown in FIG. 2. The read out character information of one row is transferred to and memorized into a register 50 having a capacity corresponding to one piece of the character information, and then transferred to a shift register 5. After the contents of the register 4 are transferred to the register 5, the next piece of the character information is read out and memorized into the register 50.

An address register 6 includes a first section for designating the address of the memory block of the pattern memory 7, the content of which is to be read out and a second section for designating a specific line of segments or dots constituting one character area, as described in more detail hereinafter. The content of the first section is renewed successively, in a manner as described hereinafter, by addresses successively delivered from the shift register 5. The content of the second section is initially "0" and changed succeedingly to "1", "2" . . . and so on by an address renew circuit 10. For example, if each character area is divided into 16 lines of dots, i.e. line #0 to line #15, the content of the second section is successively changed, in a manner as mentioned hereinafter, to "1", "2", . . . "15" and then restored to the initial state "0".

In read-out operation from the pattern memory 7, the first one of the addresses stored in the shift register is transferred to the first section of the address register 6, of which the second section is set at "0", thereby to read out the dot-pattern of line #0 of the character stored in the first address. The dot-pattern of the line #0 is stored into a memory register 8 and then transferred to a shift register 9 which transfers the dot-pattern of the line #0 one by one bit in series through an OR-gate 4 to a printer (not shown). Then, the content of the first section of the address register 6 is renewed by the next address delivered from the shift register 5 which is corresponding to the next character to be printed succeeding to the first one, while the content of the second section is still "0". The dot-pattern of line #0 of the next character is read out and transferred, in the same manner, to the printer. Thus, the dot-patterns of line #0 of the characters stored at the addresses now memorized in the shift register 5 are read-out. Thereafter, the address renew circuit 10 counts one which in turn changes the content of the second section to "1", while the content of the first section is returned to the address of the first character. Then the dot-patterns of line #1 of the same characters are read-out in the same manner as above-mentioned. In this manner, the read-out operation of the characters to be printed in one row continues until all the dot-patterns of 16 lines of the characters are completely read out to be transferred to the printer. Then the content of the shift register 5 is renewed by the content of the register 4, i.e. the addresses of the character patterns to be printed in the next row, and the dot-patterns of those characters are read-out in the same manner. Such read-out operation is repeated until all the character patterns to be printed in the same format are read-out and transferred to the printer.

Figure 3:
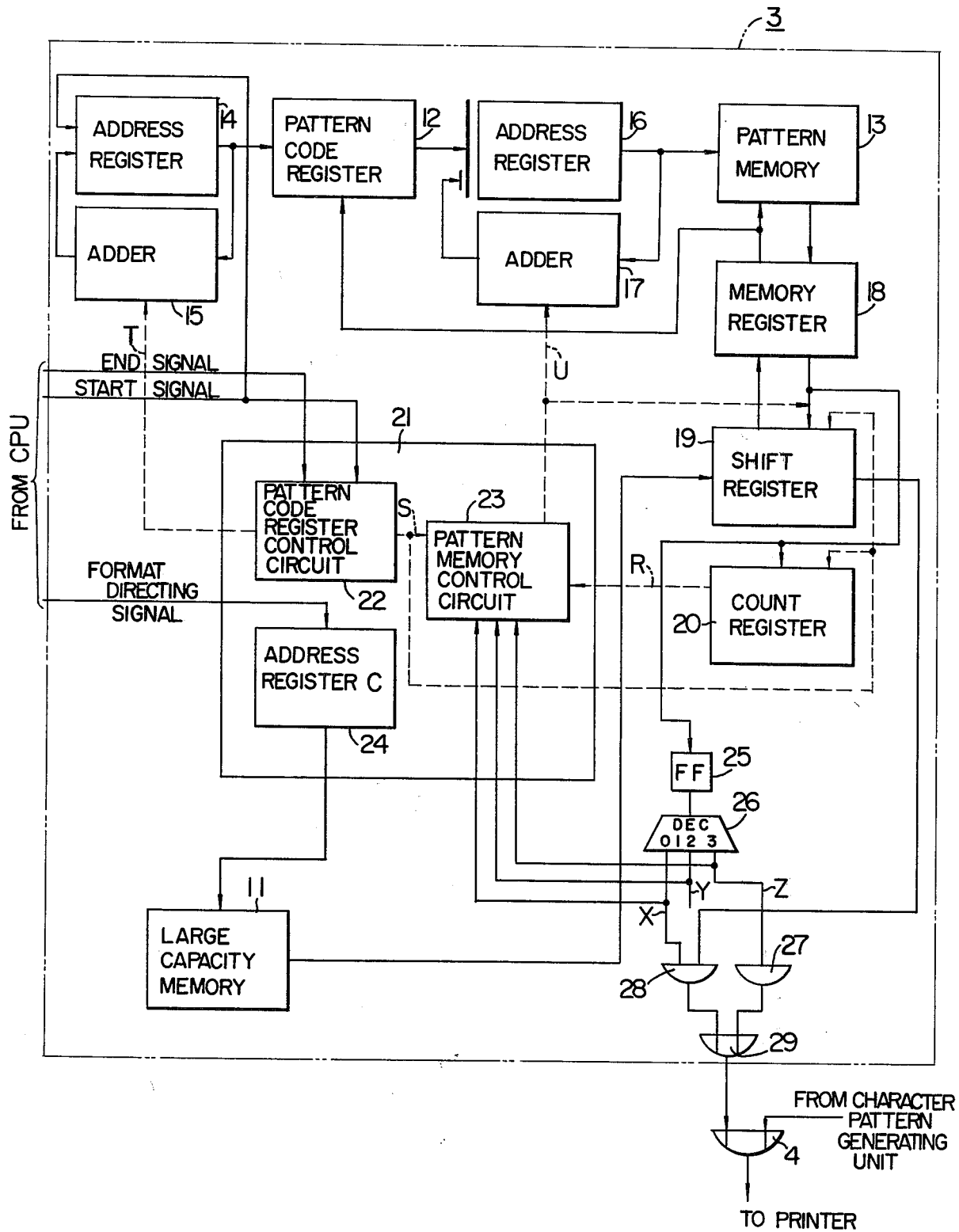
FIG. 3 is a block diagram of a format pattern generator unit according to this invention.

FIG. 3 shows a format pattern generator unit 3 in detail and a format of an account book leaf is shown in FIG. 2 to include ruled lines by way of example.

In a large capacity memory 11 shown in FIG. 3, a plurality of different kinds of format patterns are memorized. According to this invention, such a format as shown in FIG. 2 is decomposed into dots but the dots by themself are not memorized. More particularly, in the format as shown in FIG. 2, it is divided into a number of lines of dots, i.e. #0, #1, #2, . . . lines, each line includes a predetermined number of segments or dots. The format is also divided into a number of rows of character areas, as mentioned hereinbefore, i.e. rows of I, II, III, . . . , and each of the rows includes a number of character areas, i.e. areas of I', II' . . . Each of the character areas is shown in FIG. 2 to include 4 × 5 dots i.e. a 4 × 5 matrix of dots, but the area may be of any size of matrix. The patterns of the dot lines are represented by logics "1" and "0" in the same manner as the character pattern. The dot lines #0–#13 of the format in FIG. 2 are, therefore, represented by a combination of different seven line patterns as shown in Table I.

Table I

| Line No. | Line Pattern | Pattern type | Pattern Code |
| --- | --- | --- | --- |
| #0, #1, #2 | 000000 . . . . . 000000 | A | a |
| #3, #8, #12, | 000011 . . . . . 110000 | B | b |
| #4 | 00001100010...010000 | C | c |
| #5 | 00001010010..010000 | D | d |
| #6 | 00001001010..010000 | E | e |
| #7 | 00001000110..010000 | F | f |
| #9 −11, #13 | 00001000010..010000 | G | g |

Thus, the format of FIG. 2 is represented by AAABCDEFBGGGBG . . .

Therefore, it is unnecessary to memorize the individual line patterns of all the lines constituting the format, but sufficient to memorize only seven different line patterns. Thus, it is possible to save the memory area for memorizing the format pattern. As described hereinafter, each of the line patterns is represented by a pattern code which indicates the address of a memory where the line pattern is memorized. Thus, the format of FIG. 2 may be represented by aaabcdefbgggbg . . .

FIG. 6 shows the contents of the large capacity memory 11. The large capacity memory 11 may be a random access memory such as a magnetic disc memory or a magnetic drum memory.

Information representing a format I is memorized in an area I starting from an address A and a format II is memorized in an area II starting from an address B. Each area having a first section for storing pattern codes of the line patterns constituting the format and a second section for storing different line patterns included in the format. The pattern codes are stored in the form of a combination of the addresses where the respective line patterns constituting the format are stored, as shown in Table I. The addresses are, however, referring to memory blocks of the pattern memory 11 to which the line patterns are transferred later, as described hereinafter. The line patterns are each stored in the form of a combinations of logics "1" and "0". As will be seen from FIG. 2, the format usually includes many lines of the same pattern so that it is sufficient to memorize a much smaller number of different line patterns than the total number of lines of the format. In the example of FIG. 2, the format includes only seven different line patterns, that is, type A in which all the dots are blank, type B in which blank dots appear only both ends of the line pattern, type G in which all dots except for three dots corresponding to the perpendicular lines of the format are blank and types C–F which include dots corresponding to the oblique lines of the format. If it is desired to have a more precise print of the format, the format should be divided into a greater number of lines of dots. For example, if the number of lines is greatly increased so that the part of the format where the oblique line is written is divided into 20 lines of dots, the total number of different line patterns is increased to 23. In other words, it is sufficient to memorize the total of 23 dot line patterns for representing the format of FIG. 2. It will be appreciated that the format of FIG. 2 is simplified for convenience of explanation but in many applications, more sophisticated formats are used.

The pattern code section of the large capacity memory 11 memorizes the format in the form of a combination of the first addresses of the memory blocks where the individual line patterns are stored as mentioned above.

A pattern code register 12 reads out pattern codes of a selected format from the large capacity memory 11 for memorizing them and a pattern memory 13 memorizes line patterns from the large capacity memory 11.

FIGS. 7 and 8 show by way of example the contents of the pattern code register 12 and the pattern memory 13. In the pattern memory are stored all different line patterns included in the selected format at respective memory blocks which start respectively from addresses "a", "b", "c", . . . as shown. In the pattern code register are stored at the addresses "0", "1", "2" . . . in that order the respective pattern codes of the selected format represented by the addresses where the corresponding line patterns are stored. For example, if the selected format is that shown in FIG. 2, lines #0 and #1 of the format have the type A of line pattern which is stored at the memory block whose head address is "a". Therefore, the pattern code register 12 stores at its addresses "0" and "1" the address "a". Since one line pattern includes usually at least several hundred dots and one address capacity is insufficient to store all information of one line pattern. Therefore, a plurality of series addresses are used for storing the information of one line pattern. Further, if the line pattern includes a part which repeats the same logic "1" or "0", that is non-blank dot or blank dot, the part may be represented by a combination of a number code indicating the number of repeats and an identification code which discriminates whether the dot is blank, i.e. "0" or non-blank, i.e. "1" or of another thereby reducing the memory area for storing one line pattern code. Thus, it will be understood that a small capacity of memory is sufficient for storing a monotonous pattern, while a large capacity is necessary for a complicated pattern.

The head address for reading out the pattern code register 12 is set by an address register 14 which is cleared by a START signal derived from the central processor unit to return to the initial condition, for example, all "0". The START signal is applied thereto from the central processor unit so as to start the format pattern generator unit in synchronism with the start of the character pattern generator unit 2. The address register 14 is renewed successively by an adder 15 under the control of a pattern code register control circuit 22 in a control unit 21.

For reading out the pattern memory 13, an address register 16 is provided in which an address read out of the pattern code register 12 is set. The content of the address register 16 is renewed by an adder 17 under the control of a pattern memory control circuit 23. More particularly, since one line pattern is stored at a plurality of addresses of the pattern memory, as mentioned before, the content of the address register is changed, after the information of one address is read out, to a code indicating the next address by the adder 17 which counts "one" each time when one address is read out.

In a memory register 18, information read out of the pattern memory 13 or information read out of the large capacity memory 11 to be written in the pattern memory 13 or the pattern code register 12 is stored.

A shift register 19 is provided to convert information in the form of serial bits read out from the large capacity memory 11 into parallel bit information which is delivered to the memory register 18 or to convert parallel bit information transferred from the memory register 18 into serial bit information which is delivered to an AND-gate 28.

The line pattern information delivered to the memory register 18 from the pattern memory 13 includes an identification code as mentioned before and the remaining code which may be either a code indicating the number of repeats of the same dot or a series of logics each indicating the condition of respective dot. The identification code is applied to a two-bit flip-flop 25, while the remaining code is applied for setting a count register 20 at a value represented by the code.

In printing operation, a FORMAT directing signal is transferred from the central processor unit in advance of initiation of printing operation. This FORMAT directing signal is one indicating the address A when a format I of FIG. 6 is selected, and latched in an address register 24 to read out the large capacity memory 11 in accordance with this address. The read-out operation of the large capacity memory is carried out in a conventionally well-known manner and is not detailed herein.

Information including pattern codes and line patterns is read out of the large capacity memory 11 and subjected to serial to parallel bit conversion in the shift register 19. The converted information is further transferred via the memory register 18 to store the pattern codes in the pattern code register 12 and the line patterns in the pattern memory 13.

Subsequently, the START signal is delivered to the address register 14 and the pattern code register control circuit 22 thereby to start the operation thereof in synchronism with the character pattern generator unit 2. The address register 14 is set to the initial value and the head address stored in the pattern code register 12 is read out to be set into the address register 16. A pattern information which is stored at this address which is set in the address register 16 is read out of the pattern memory 13 and transferred to the memory register 18. Identification code section included in the pattern information is set into the two bit flip-flop 25 and the remaining section is set into the shift register 19 and the count register 20.

The identification code is one of the following four codes depending on what is indicated by the remaining code:

00: (Print Pattern) Each of the bits of the remaining code indicates the condition of the corresponding dot.

10: (Space) The remaining code indicates the number of repeats of logic "0".

11: (Solid line) The remaining code indicates the number of repeats of logic "1".

01: Indefinite

The identification code is decoded in a decoder 26 such that a high level or logic "1" appears on the signal line X with "00" being decoded, on Y with "10" and on Z with "11", respectively.

With signal line X of logic "1", the AND-gate 28 is opened. On the other hand, the shift register 19 delivers its content one by one bit under the control of timing signal S from the pattern code register control circuit 22. Consequently, the format pattern is transferred to the OR-gate 4 via an OR-gate 29 so as to be superimposed on the character pattern information. When detecting that all of contents in the shift register 19 are transferred, the pattern memory control circuit 23 causes the adder 17 to count "one" thereby to change the content of the address register 16 thereby to the next address for reading out the next part of the same line pattern stored there.

With signal line Y of logic "1", both the AND-gates 27 and 28 are closed, so that no substantial signal is applied to the printer, while the number of repeats of logic "0" set into the count register 20 is subtracted by "on" each occurrence of the timing signal S. When the content of the count register 20 reaches zero, the count register 20 delivers a signal R to the pattern memory control circuit 23. Accordingly, this is the same as if the OR-gate 4 receives the same number of logics "0" as that set in the count register 20. When receiving the signal R, the pattern memory control circuit 23 drives the adder 17, thereby renewing the content of the address register 16.

With signal line Z of logic "1", the AND-gate 27 is opened. On the other hand, the number of repeats of logic "1" has been set in the count register 20 so that, similar to the case of signal line Y bearing logic "1", the OR-gate 4 receives the same number of logics "1" as that set in the count register 20 and then the address register 16 is renewed. In this manner, pattern information is read out successively to be delivered to the OR-gate 4.

The pattern code register control circuit 22 detects that the code indicating one line pattern is completely transferred and then drives the adder 15 to renew the content of the address register 14, by which the head address for the next line pattern is read out of the pattern code register 12.

By repeating similar procedures, the format pattern is delivered to the OR-gate successively. At the termination of generation of print information for one sheet of account book leaf, an END signal sent from the central processor unit stops the format pattern generator 3 operating.

Figure 5:
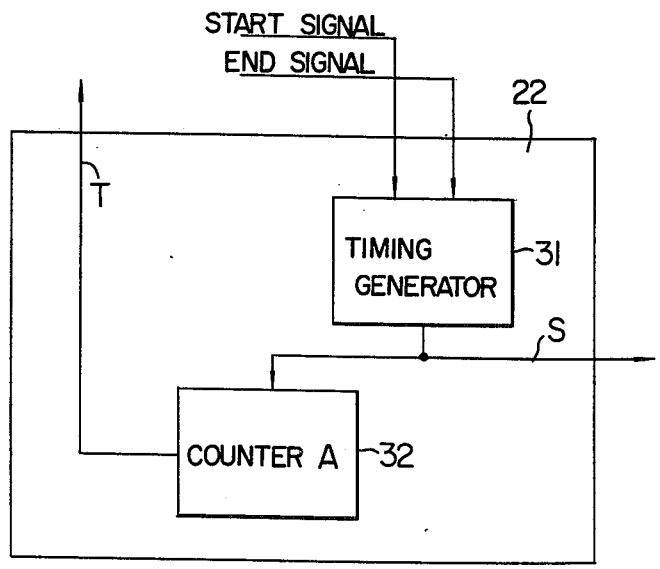
FIG. 5 is a detailed block diagram of a pattern code register control unit in the format pattern generator unit according to this invention.

FIG. 5 shows the pattern code register control circuit 22 in detail. A timing signal generator 31 generates a timing signal in synchronism with the transfer rate of dots from the character pattern generator unit 2. The operation of the timing signal generator is started by the START signal and stopped by the END signal. A timing signal S generated by the timing signal generator 31 also causes a counter 32 to count up. When the counter 32 counts the same number as that of dots included in one dot line of the format, it overflows thereby to produce "1" at its output T. Thus, the overflow of the counter 32 indicates that all of the dot information concerning with one line pattern have been transferred.

Figure 4:
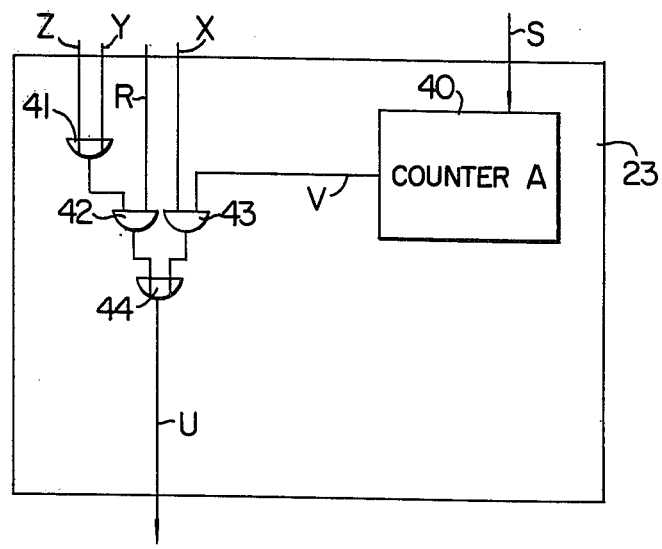
FIG. 4 is a detailed block diagram of a pattern memory control unit in the format pattern generator unit according to this invention.

FIG. 4 shows the pattern memory control circuit 23 in detail. A counter 40 counts the number identical to the number of bits read out by the memory register 18 minus two bits (identification code) and then overflows to produce "1" at its output V, which therefore indicates that all of the bits, which are read out from the pattern memory 13 and each of which indicates the condition of the corresponding dot, have been transferred.

With signal line X being a logic "1" and the overflow signal V of the counter 40 bearing logic "1", an AND-gate 43 is opened to send through an OR-gate 44 a signal $u$. With signal line Y of logic "1" and the signal line Z of logic "1", along with the signal R from the count register 20, an AND-gate 42 is opened to send the signal $u$. The signal $u$ is used to drive the adder 17.

I claim:

1. A print pattern generating apparatus for generating a print pattern including information relating to characters and formats to be printed, said apparatus comprising:

a character pattern generator for producing a pattern of characters to be printed on a printing medium as a plurality of successively produced character dot line signals, each including character dot line information relating to a part of said character pattern to be disposed in an incremental linear area extending from one end to the other over the whole width of said printing medium, said character dot line signals being produced successively in an order corresponding to the arrangement of said characters on said printing medium, a format pattern generator for producing a format pattern of a format to be printed on said printing medium, said generator comprising format dot line information memory means for storing only different format dot line signals, each of said format dot line signals representing at least one part of said format pattern to be disposed in an incremental linear area extending from one end to the other over the whole width of said printing medium, means for selectively reading out said format dot line signals in an order so as to constitute said format pattern, and means for superimposing each of said successively produced character dot line signals on a corresponding one of said successively read-out format dot line signals which is to be disposed in the same incremental area of said printing medium as that to which said each character dot line signal is to be disposed.

2. An apparatus according to claim 1, wherein said format dot line signal read out means comprises: address memory means for storing a set of such addresses of said format dot line information memory means, which addresses are arranged such that the format dot line signals stored at said addresses constitute said format pattern, means for successively reading out said addresses stored in said address memory means and means for reading out from said format dot line information memory means successively the contents stored in said successively read out addresses.

3. An apparatus according to claim 2, wherein said format pattern generator further comprises format pattern information memory means for storing format pattern information relating to a number of different format patterns, said information including dot line information relating to different ones of the format dot line signals constituting each of said different format patterns and address information including a set of addresses designating respective locations in said format dot line information memory means where the format dot line signals constituting said each format pattern are to be stored, and means for selecting one of said different format patterns and transferring said format pattern information relating to said selected format pattern from said format pattern information memory so that said dot line information is transferred to said format dot line information memory means so as to store said different format dot line signals included therein into said locations thereof designated by said address information and so that said address information is transferred to said address memory means to store said set of addresses included therein into said address memory means.

4. An apparatus according to claim 1, wherein said format dot line information memory means comprises means for compressing the format dot line information so as to store said dot line information in a compressed form and means for expanding the compressed dot line information when read out.

* * * * *